INVENTOR.
JOHANNES J.A.P. VAN AMSTEL
BY
AGENT

United States Patent Office 3,499,785
Patented Mar. 10, 1970

3,499,785
COATING SUBSTRATES BY EVAPORATION-DEPOSITION
Johannes Jacobus Asuerus Ploos van Amstel, Emmasingel, Eindhoven, Netherlands, assignor, by mesne assignments, to U.S. Philips Corporation, New York, N.Y., a corporation of Delaware
Filed Jan. 4, 1967, Ser. No. 607,177
Claims priority, application Netherlands, Jan. 7, 1966, 6600179
Int. Cl. B44d 1/18; C23c 13/02, 13/04
U.S. Cl. 117—107
7 Claims

ABSTRACT OF THE DISCLOSURE

A method of coating substrates by evaporation-deposition in which the substance to be evaporated is melted in a crucible having a hole in its bottom, and a wire extending through the hole such that the melt flows by gravity and/or capillary action onto or over the wire surface, is heated causing evaporation of the substance from the wire.

---

Figure 1:
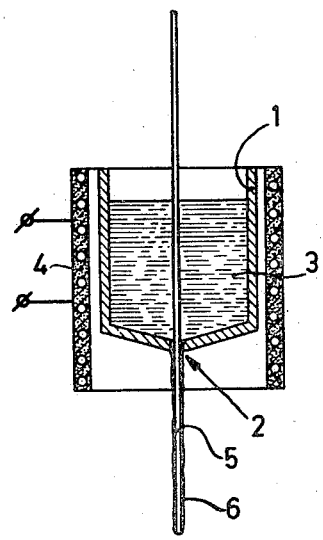

This invention relates to methods of coating substrates by evaporation-deposition.

As is well-known, this process is usually carried out in an atmosphere which is inert relative to the substance to be deposited, the gas pressure having to be low in order that the vapour molecules are hindered to the least possible extent on their way to the substrates to be coated; for this reason the process usually takes place in vacuo.

In known methods the substance to be applied is evaporated by means of a device heated by passage of current, by means of an arc discharge, by high-frequency heating or by electron bombardment.

In the present invention, the simple heating by passage of current is chosen, since, in contrast with other heating techniques, in that case it is not necessary to use equipment which is complicated, expensive and in certain cases even dangerous.

In several of the known methods the substance to be evaporated is provided directly on the surface of a heating element beforehand. This has the disadvantage that only a limited quantity of the material can be provided and therefore prolonged evaporation-deposition as is required in a continuous process and in applying thick layers is impossible.

In other known methods this disadvantage is overcome by placing a large quantity of the substance to be evaporated either directly or in a separate container within a heating body consisting of, for example, a helically wound wire. However, in such cases, shadow effect of the wire body occurs interfering with the formation of a uniform coating by evaporation. If the substance is evaporated from a container which is not surrounded by the heating body, so that the said shadow effect does not exist, it will be necessary for obtaining a sufficiently high temperature at the surface of the substance in order to ensure adequate evaporation, that the substance located beneath the surface is strongly overheated. As a result thereof, for example, troublesome reactions with the material of the evaporator may occur and, insofar the substance consists of a compound, dissociation may take place.

An object of the invention is inter alia to mitigate the above-mentioned disadvantages which obstruct the obtainment of uniform and comparatively thick layers, such as are important especially in the manufacture of semiconductor devices.

According to the invention, in a method of coating substrates by evaporation deposition, especially for use in the manufacture of semiconductor devices, the substance to be deposited is melted in a separate container and the melt is allowed to flow continuously out of it over the surface of a heating element which is heated to a temperature required for the evaporation.

The method according to the invention is generally applicable to the coating of substrates by evaporation deposition, especially for use in the manufacture of semiconductor devices. The substance is preferably introduced into a crucible provided with an aperture in its bottom, in which crucible the substance is melted, the molten substance flowing through the aperture over the surface of a heated wire arranged near the aperture and serving as an evapoartor, and the substrates to be coated being exposed to the vapour evolved. In this way the evaporation process may be continued until the crucible is substantially emptied. Moreover, gravity aids in sufficiently supplying the melt to the wire, such that said melt may spread over a substantial length of the wire. The wire may be heated in known manner by passage of current.

The wire may be arranged so that one extremity thereof extends through the aperture into the crucible.

The wire may be arranged in vertical position. In such a position the length of wire from which evaporation may take place, may be very large as the effect of gravity is increased. In this way large areas or the surfaces of a large number of devices may be covered by means of the evaporation process. The length of wire from which evaporation occurs, may for instance, even extend to about one meter. However, an inclined or even horizontal position is also possible. In the last-mentioned case it is advantageous in order to obtain uniform covering of the evaporator wire, to use two crucibles for the substance to be evaporated, each having an aperture preferably in the bottom and each being arranged at one extremity of the evaporator wire, said wire preferably comprising a horizontal portion between two vertical portions extending within the apertures in the crucible bottom.

The heating process for melting the substance in a crucible, may be carried out in an arbitrary manner. For example, heating may take place by radiation from or contact with a heating body or by passage of current through the material to be melted.

Although a separate source of heat may be used for melting, since the correct temperature may then be adjusted in a simple manner, the heat sources for melting and for evaporating may alternatively be combined into a single element to be heated by passage of current, which is devised such that the temperatures required for melting and for evaporating the substance are locally reached.

To this end, for example, the heating element may be led around or through the crucible and, after passing through the aperture of the crucible, merge into a portion serving as the evaporator. The correct temperatures for melting and for evaporating the substance may be adjusted by suitable proportioning of the heating element.

The rate of supply of the substances to be evaporated and the rate of evaporation may be controlled by means of the temperature and the magnitude of the apertures in the crucibles. Further, the shape of the evaporator may be of influence. So the evaporator may consist of a plurality of wires, for instance, twisted together or in the form of another texture. In this way the supply of material onto the evaporator may be enhanced, for example, due to capillary action. The use of such an evaporator may therefore be advantageous and even necessary in cases where the molten substance does not or insufficiently wets the material forming the evaporator.

The size of the crucibles may naturally be matched to the quantity of material which it is desired to deposit. If the dimensions are unduly large, however, the differences in height of the melt may give rise to pressure differences, which may cause a troublesome decrease in the rate of supply of the material to the evaporator. Further, there may be cases where it is objectionable to keep a large quantity of material in the molten stage for a long period, for example, in view of the occurrence of reaction with the wall of the crucible, dissociation of the material for easy volatility of the material to be evaporated at the melting temperature.

In order that in such cases the evaporating process may yet be continued for a comparatively long period, the crucible may be replenished during the evaporation process, which may enable the use of comparatively small crucibles, and fresh material may continuously be supplied to the melt, for example, in the form of powder, grains or wire.

The melt may be supplied to the evaporator at a rate such that it has ben consumed substantially after having passed the zone in which the substrates to be coated are arranged. If necessary, the excess material may be collected in a small vessel at the end of the evaporator in order to inhibit contamination of the current supply contact located in situ.

It has been found that despite differences in thickness of the layer of the substance to be evaporated present on the evaporator, which differences occur in the longitudinal direction of the evaporation region, differences in thickness of the layers on the substrates are hardly noticeable. These differences in general are less than 5% and mostly less than 1%, for example, over a length of 10 cms. of the evaporation region and for a distance of 5 cms. between the evaporator and the substrate. This fact may be due to the circumstance that the differences in thickness of the layer on the evaporator have little influence on the distance between the evaporator and the substrate, and that a locally smaller thickness of the layer and the consequent smaller cross-section causes a slight increase in temperature of the evaporator at said location. For the sake of completeness, it should be noted that for satisfactory adhesion of the material to the substrates, it may be advantageous, as is known per se, to heat the substrates during deposition.

The evaporation process according to the invention, may be carried out with all sorts of fusible materials, for example, gold, copper, manganese, tin, antimony, silver, germanium, silicon, compounds such as oxides of lead, antimony and bismuth, and mixtures of substances such as alloys of gold-copper and silver-copper, the method of deposition being especially suitable for applying epitaxial layers to a monocrystalline substrate. Especially in the semiconductor technique it is known to use bodies consisting of a monocrystalline semiconductor substrate to which a semiconductor layer is applied epitaxially.

It will usually be possible for the materials forming the crucibles and the evaporator wires to be chosen so as to be sufficiently resistant to the substances to be deposited at their operational temperatures.

All sorts of heat-proof materials are usable for the crucibles and for the evaporators, for example, graphite, tungsten, molybdenum and platinum. Substances which are electrically non-conducting, for example, quartz, aluminum oxide and boron nitride, may also be used for the crucibles.

As is well-known, the evaporation-deposition may be carried out in vacuo, but if desired it is possible to use a gas atmosphere of low pressure, for example, an inert gas atmosphere of low pressure which consists of argon or nitrogen.

In order that the invention may be readily carried into effect, it will now be described in detail, by way of example, with reference to the accompanying diagrammatic drawing and a few examples.

Figure 2:
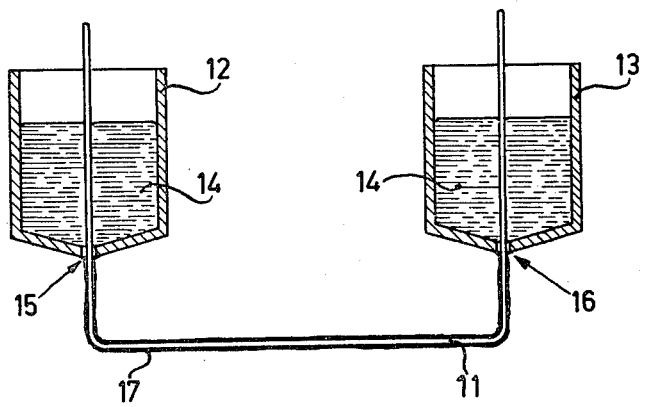

FIGURES 1 and 2 show embodiments of a device for evaporation deposition according to the invention in vertical cross-section.

FIGURE 1 shows a crucible 1 having an aperture 2 in its base. A substance 3 in the crucible 1 is melted by means of a heating element 4 surrounding the crucible. An evaporator wire 5 passes through the aperture 2 and is covered by the molten substance flowing out of aperture 2 with a layer 6 thereof, which is continuously supplemented from the crucible and evaporated on this portion of the wire.

FIGURE 2 shows an embodiment of the invention, in which an evaporator wire 11 is placed in horizontal position. This embodiment utilises two crucibles 12 and 13 in which a substance 14 is melted and flows through apertures 15 and 16 over the evaporator 11 which passes through the crucibles, thus forming a layer 17 on the evaporator.

EXAMPLE I

The crucible of a device as shown in FIGURE 1, which consists of graphite, is filled with 5 gms. of pure germanium. The aperture of the crucible has a diameter of 1.1 mm. and through it passes an evaporator consisting of twisted tungsten wires of 0.5 mm. in diameter and having a total length of 300 mm.

The evaporator is surrounded by a substrate holder of hexagonal section with an inscribed circle having a radius of 15 mm., and a height of 80 mm.

The substrate holder is provided with 24 plate-shaped monocrystals of approximately 18 mm. in diameter and 0.6 mm. thick consisting of germanium with a dope of $10^6$ atm./ccm. of antimony.

The whole is placed under a recipient, followed by exhaustion to a pressure less than $10^{-5}$ mm. mercury.

By means of an electric oven placed round the substrate holder, the germanium crystals are preheated in vacuo at 850° C. for 5 minutes, which temperature is also maintained during the subsequent depositing process.

The germanium in the graphite crucible is melted by means of electric oven surrounding it and maintained at 1000° C.

Subsequently the evaporator is heated by passage of current at a voltage of 13 volts. The current upon switching in is 30 amps. and then increases within approximately ¾ min. (still at a voltage of 13 volts) to a value of 45 amps., which remains constant for 70 seconds. The temperature is estimated at about 1800° C. The substrates are exposed to the evaporating germanium only during these 70 seconds. The germanium is vapour collected before and after this period on a cylindrical screen of, for example, molybdenum which may temporarily be placed between the substrates and the evaporator.

It has been found that the monocrystalline substrates grow epitaxially during the evaporation-deposition. The thickness of the coating is 70 microns.

The resulting products are important for the manufacture of semiconductor devices such as transistors.

EXAMPLE II

Use is made of a similar arrangement to that described in Example I. The crucible is in this example a quartz crucible 60 mm. long and 17 mm. in diameter having an aperture of 1.25 mm. in diameter.

An evaporator consisting of seven twisted molybdenum wires of 0.4 mm. in diameter passes through the aperture. The element has a total length of 300 mm.

A glass cylinder having a radius of 55 mm. and a height of 100 mm. is placed as a substrate around the evaporator.

After 20 gms. of copper in the quartz crucible have been melted to a temperature of 1200° C. and the glass cylinder has been heated at 500° C. for 5 minutes, the evaporator is heated by passage of current at a voltage of 7 volts.

Upon switching in, the current is 33 amps and then increases to 40 amps within ¾ minute due to wetting with the molten copper. This current remains constant for 3 minutes and then decreases to 33 amps within ½ minute, whereafter the current is switched off. The temperature of the evaporator was estimated at about 1600° C.

A copper layer of 45 microns thick was deposited.

EXAMPLE III

In a similar manner as has been described for germanium and copper, lead monoxide (PbO) is evaporation-deposited, the deposition in this example being effected in an oxygen-containing gas atmosphere of low pressure.

The crucible used is a platinum crucible of 15 mm. in diameter and 30 mm. high and having an aperture of 1.1 mm. in diameter.

The evaporator consists of three twisted plantinum wires of 0.5 mm. in diameter and having a total length of 300 mm.

Glass substrates are arranged around the evaporator at a distance of 55 mms.

The substrates are degassed in vacuo at 500° C. for 20 minutes and cooled down to a temperature of 50° C.

20 gms. of PbO are maintained in the molten state at 900° C. in the platinum crucible, whereafter the evaporator is switched on at a voltage of 7 volts A.C. The initial current is 22 amps. After ½ minute the current increases to 25 amps and then remains constant. After having been maintained at this constant current strength for approximately 2 minutes, the current is switched off.

By the use of a cylindrical screen as described in Example I, the substrates are exposed to the evolving PbO-vapour only during these two minutes, in which the current is at a maximum. The evaluated temperature of the evaporator is 1100° C.

During the evaporation-depositing process the temperature of the substrates increases to approximately 120° C.

A uniform PbO-layer between 20 and 30 microns is obtained on the substrates. The substrates used may alternatively be glass substrates which have been previously covered on their sides adjacent the evaporator, with a thin transparent conductive layer consisting of, for example, tin oxide. The products obtained after the deposition with lead oxide are usable in semiconductor devices, for example, as photosensitive elements in camera tubes.

What is claimed is:

1. A method of coating substrates by evaporation deposition of a substance, comprising providing the substance to be evaporation deposited in a crucible having an aperture in a bottom wall portion thereof, melting the said substance within the crucible, providing at least in the near vicinity of the aperture a heated wire such that the molten substance flows through the aperture over the surface of the heated wire and evaporates therefrom, and exposing the substrate to be coated to the substance being evaporated from the wire.

2. A method as set forth in claim 1 wherein the wire is arranged such that one end extends through the aperture into the crucible and into the melt therein.

3. A method as set forth in claim 2 wherein the wire is arranged in a vertical position having an elongated portion extending below the crucible.

4. A method as set forth in claim 1 wherein the evaporator wire comprises plural twisted wires.

5. A method as set forth in claim 1 wherein the crucible is replenished with new substance during the evaporation step.

6. A method as set forth in claim 1 wherein the wire has a construction providing capillary action to spread the melt over the surface of the wire.

7. A method as set forth in claim 1 wherein two apertured crucibles are provided containing melt, the wire extends through the apertures in both crucibles, and the wire portion between the crucibles is predominantly horizontal.

References Cited

Holland, Vacuum Deposition of Thin Films, 1956, pp. 118–121 relied upon.

ANDREW G. GOLIAN, Primary Examiner

U.S. Cl. X.R.

117—97, 106, 201, 211. 227